US010375427B2

(12) United States Patent
Hundemer et al.

(10) Patent No.: US 10,375,427 B2
(45) Date of Patent: *Aug. 6, 2019

(54) SYSTEM FOR PROVIDING SUPPLEMENTAL CONTENT FOR VIDEO TRANSPORT STREAM

(71) Applicant: Tribune Broadcasting Company, LLC, Chicago, IL (US)

(72) Inventors: Hank Hundemer, Bellevue, KY (US); Dana Lasher, Morgan Hill, CA (US)

(73) Assignee: Tribune Broadcasting Company, LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/201,518

(22) Filed: Nov. 27, 2018

(65) Prior Publication Data

US 2019/0098346 A1 Mar. 28, 2019

Related U.S. Application Data

(63) Continuation of application No. 15/969,465, filed on May 2, 2018, now Pat. No. 10,178,416, which is a (Continued)

(51) Int. Cl.
*H04N 21/234* (2011.01)
*H04N 21/61* (2011.01)
(Continued)

(52) U.S. Cl.
CPC ... *H04N 21/23424* (2013.01); *H04N 21/2221* (2013.01); *H04N 21/233* (2013.01);
(Continued)

(58) Field of Classification Search
CPC ............ H04N 21/434; H04N 21/2183; H04N 21/231; H04N 21/23424
See application file for complete search history.

(56) References Cited

U.S. PATENT DOCUMENTS 9,503,761 B2 * 11/2016 Hundemer ....... H04N 21/23424
10,003,832 B2 * 6/2018 Hundemer ....... H04N 21/23424
(Continued)

*Primary Examiner* — Junior O Mendoza
(74) *Attorney, Agent, or Firm* — McDonnell Boehnen Hulbert & Berghoff LLP

(57) ABSTRACT

A method and system to facilitate localized replacement of one or more commercials or other instances of base content in a video feed with replacement-media delivered in a separate broadcast TV transport stream. A local TV station that broadcasts to an area covering a video program distributor (VPD) includes supplemental content, such as replacement commercials, within its broadcast in a manner that standard broadcast-TV receivers would disregard but that a equipment at the VPD will receive and process. The equipment at the VPD thus receives the local broadcast from the TV station and extracts from the broadcast the included supplemental content. And equipment at the VPD inserts the extracted supplemental content in place of one or more instances of base content in a transport stream that the VPD receives separately from a video-program source, so as to establish a modified transport stream for delivery to end-user TV receivers.

20 Claims, 8 Drawing Sheets

Related U.S. Application Data continuation of application No. 15/341,712, filed on Nov. 2, 2016, now Pat. No. 10,003,832, which is a continuation of application No. 14/636,575, filed on Mar. 3, 2015, now Pat. No. 9,503,761.

(60) Provisional application No. 62/111,474, filed on Feb. 3, 2015.

(51) Int. Cl.
| | | |
|---|---|---|
| *H04N 21/235* | (2011.01) | |
| *H04N 21/233* | (2011.01) | |
| *H04N 21/258* | (2011.01) | |
| *H04N 21/2665* | (2011.01) | |
| *H04N 21/81* | (2011.01) | |
| *H04N 21/222* | (2011.01) | |

(52) U.S. Cl.
CPC ... *H04N 21/2353* (2013.01); *H04N 21/23418* (2013.01); *H04N 21/25841* (2013.01); *H04N 21/2665* (2013.01); *H04N 21/6112* (2013.01); *H04N 21/6118* (2013.01); *H04N 21/6143* (2013.01); *H04N 21/812* (2013.01)

(56) References Cited

U.S. PATENT DOCUMENTS

| | | | |
|---|---|---|---|
| 10,178,416 B2* | 1/2019 | Hundemer | H04N 21/23424 |
| 2002/0064189 A1* | 5/2002 | Coupe | H04N 21/434 |
| | | | 370/537 |
| 2006/0287915 A1* | 12/2006 | Boulet | G06Q 30/02 |
| | | | 705/14.61 |
| 2013/0191858 A1* | 7/2013 | Kanojia | H04N 21/2393 |
| | | | 725/25 |

* cited by examiner ately-available products, services, and/or other VPD-distributed video content, and the VPD may insert that local video content into the transport stream, possibly in place of other content in the transport stream, for distribution to end-user TV receivers in the VPD's market area.

SYSTEM FOR PROVIDING SUPPLEMENTAL CONTENT FOR VIDEO TRANSPORT STREAM

REFERENCE TO RELATED APPLICATIONS

This is a continuation of U.S. patent application Ser. No. 15/969,465, filed May 2, 2018, which is a continuation of U.S. patent application Ser. No. 15/341,712, filed Nov. 2, 2016, and issued as U.S. Pat. No. 10,003,832, which is a continuation of U.S. patent application Ser. No. 14/636,575, filed Mar. 3, 2015, and issued as U.S. Pat. No. 9,503,761, which is incorporated by reference in its entirety and claims priority to U.S. Provisional Application No. 62/111,474, filed Feb. 3, 2015.

BACKGROUND

Unless otherwise indicated herein, the description provided in this section is not itself prior art to the claims and is not admitted to be prior art by inclusion in this section.

In order to deliver video program content to end-users for presentation on televisions (TVs) and other such devices, a provider of the content may transmit the content to one or more video program distributors (VPDs) that in turn transmit the content to various end-user TV receivers. Such a hierarchical arrangement can facilitate convenient, widespread distribution of content.

By way of example, in order for a media company to distribute video program content to end-user TV receivers throughout the United States, the media company may transmit the video program content by satellite or other medium for receipt by VPDs that serve respective market areas within the United States. Each such VPD may thus receive the national satellite feed carrying the video program content and transmit the video program content to end-user TV receivers in the VPD's market area. In practice, these VPDs and their means of transmission to end-user TV receivers may take various forms. For instance, the VPDs may include cable-television providers that transmit video program content to end-user TV receivers (e.g., cable TV subscriber devices) through hybrid fiber/coaxial cable connections, terrestrial over-the-air broadcast TV providers that transmit video program content through terrestrial air interfaces to end-user TV receivers (e.g., standard digital televisions or associated adapters), and others.

The video program content in this arrangement may comprise one or more TV shows along with one or more commercials positioned within or between TV shows. Further, the video program content may comprise multiple TV channels, each of which may in turn carry one or more TV shows and one or more commercials, in which case the VPDs may be multi-channel video program distributors (MVPDs) that provide end-users with a selection of multiple channels to watch. Further, the video program content may be digitized and packetized for transmission as a transport stream from the video content provider to the VPDs and from the VPDs to the end-user TV receivers.

SUMMARY

In addition to receiving a video transport stream and passing content of the stream along to end-user TV receivers, a VPD may also receive supplemental content and add the supplemental content to the transport stream for distribution to end-user TV receivers. By way of example, a VPD that receives a national video feed may also receive local video content such as local news shows and commercials that advertise or promote locally-available products, services, and/or other VPD-distributed video content, and the VPD may insert that local video content into the transport stream, possibly in place of other content in the transport stream, for distribution to end-user TV receivers in the VPD's market area.

As a specific example of this, a received national video feed may include a number of commercials (some possibly as simple as a black screen showing the national provider's logo) or other base content, and equipment at the VPD may replace some of that base content with commercials or other replacement content that is more specific to the VPD's market area. To facilitate this, the transport stream that the VPD receives may include certain in-band audio tones or out-of-band signals that demarcate points where the VPD can insert replacement content, and equipment at the VPD can then perform the insertion automatically at those points.

At issue in this arrangement, however, is how to provide this replacement content to the VPD so that the equipment at the VPD can insert the replacement content into the received transport stream in place of base content in the transport stream. One way to do this is to transmit the replacement content to the VPD through the Internet. For instance, a provider of locally-relevant commercials could transmit the commercials to equipment at the VPD using File Transfer Protocol (FTP) or BitTorrent transmission over the Internet. For various reasons, however, transmission of replacement content through the Internet may be undesirable. Therefore, an alternative is desired.

Disclosed herein is a method and system to facilitate localized replacement of one or more commercials or other base content in a video feed with replacement-media delivered in a separate broadcast TV transport stream. In particular, a local TV station that broadcasts over the air to an area covering a VPD will include supplemental content, such as replacement commercials, within its over-the-air broadcast in a manner that standard end-user broadcast-TV receivers would disregard but that a special equipment at the VPD will receive and process. The equipment at the VPD will thus receive the local broadcast from the TV station and will extract from the broadcast the included supplemental content. As the VPD receives a transport stream from a video content provider separate from broadcast TV transport stream received from the local TV station, the VPD will then insert the extracted supplemental content into the received transport stream in place of one or more commercials or other base content within the received transport stream. And the VPD will then transmit to end-user TV receivers the resulting modified transport stream including the inserted supplemental content.

This method and system may operate in a scenario where the local TV station provides its over-the-air broadcast as a digital transport stream compliant with an industry standard such as the Advanced Television Systems Committee (ATSC) Digital Television Standard A/53, in which case end-user TV receivers may comprise digital television adapters (DTAs) configured to receive and process such transport streams. Such a transport stream may be made up of a sequence of packets each having a packet-identifier (PID) that characterizes payload of the packet—perhaps indicating whether the packet carries audio content, video content, closed-captioning content, or the like. Further, in such a stream, the TV station may include from time to time an index-packet that carries an index specifying which PIDs correspond with which types of payload, so that recipient TV receivers can process packets based on their PIDs. Thus, as an end-user TV receiver receives packets of such a transport stream, the receiver may read the PID of each packet to determine, based on a latest provided index, what type of payload the packet contains and may process the payload accordingly.

To facilitate providing supplemental content to a VPD in this scenario, the local TV station may transmit the supplemental content in packets with special PIDs that are not so indexed, so that standard end-user TV receivers will not process the packets (as the packet payload will be of an unknown type), but a broadcast-TV receiver with associated control logic at the VPD may be programmed to detect those special PIDs as indicating that the payload in those packets is supplemental content. Unlike standard end-user TV receivers, the equipment at the VPD may thus process those packets to extract at least a portion of the supplemental content from the packets and store the extracted supplemental content at the VPD. In turn, the VPD may then insert the extracted supplemental content into a separately received transport stream in place of one or more commercials, so as to generate a modified transport stream containing the supplemental content, and the VPD may then deliver the modified transport stream to end-user TV receivers for playout.

Accordingly, in one respect, disclosed is a method involving localized replacement of base content in a video feed, with replacement media delivered in a broadcast TV transport stream. In accordance with the method, a computing system at a local VPD (i.e., a VPD serving a particular geographic market) receives a first transport stream broadcast from a TV station (e.g., a terrestrial over-the-air broadcast TV station), and the received first transport stream includes standard media content that is indexed for processing by standard broadcast-TV receivers and supplemental media content that is not indexed for processing by standard broadcast-TV receivers. Further, the computing system extracts from the received first transport stream at least one portion of the supplemental media content (e.g., one or more locally-relevant commercials), to facilitate insertion of that supplemental content into a transport stream to be delivered to end-user TV receivers.

In addition, the computing system receives from a video-program source other than the TV station (e.g., from a C-band satellite TV feed) a second transport stream for delivery by the local VPD to customer premises equipment (CPE) receivers that are served by the local VPD, and the received second transport stream includes base content such as one or more TV shows and one or more commercials. The computing system then injects the extracted portion of the supplemental media content into the second transport stream in place of at least one instance of the base content (e.g., in place of one or more commercials), so as to establish a modified version of the second transport stream having the extracted portion of the supplemental media content injected in place of the at least one instance of the base content (so that the modified version of the second transport stream includes one or more instances of the base content and one or more instances of the inserted supplemental content). And the computing system outputs the modified version of the second transport stream for transmission by the local VPD to the CPE receivers served by the local VPD.

In another respect, disclosed is a method characterized from the perspective of one or more entities that may provide the first and second transport streams and that may arrange for the equipment at the VPD to carry out features such as those noted above. An example of such an entity is a media company that owns or operates both the broadcast TV station that provides the first transport stream and the video-program source that provides the second transport stream. As a specific example, this could be a company that provides a national video feed to VPDs throughout the United States but that also owns or operates a local terrestrial broadcast TV station that serves end-users in a particular geographic market encompassing the VPD.

In accordance with this method, a TV station broadcasts (e.g., through terrestrial over-the-air broadcast) a first transport stream that carries standard media content indexed for processing by standard broadcast-TV receivers and that carries supplemental media content not indexed for processing by standard broadcast-TV receivers. Further, a video-program source broadcasts (e.g., through satellite transmission) a second transport stream that carries one or more TV shows and one or more commercials. And equipment at a local VPD receives the broadcast first transport stream and the broadcast second transport stream and carries out operations such as those noted above. For instance, the equipment (i) extracts at least a portion of the supplemental media content from the received first transport stream, (ii) injects the extracted portion of the supplemental media content into the received second transport stream in place of at least one of the one or more commercials, and (iii) outputs, for transmission by the local VPD to CPE receivers served by the local VPD a modified version of the second transport stream having the injected supplemental media content in place of the at least one commercial.

Additionally, in still another respect, disclosed is computing system that could be implemented at a VPD to carry out operations such as those noted above. Such a computing system may include at least one communication interface, at least one processing unit, at least one non-transitory data storage medium, and program instructions stored in the at least one data storage medium and executable by the at least one processing unit to carry out various operations.

In line with the discussion above, the operations carried out by such a computing system may include receiving via the at least one communication interface a first transport stream that is broadcast terrestrially over the air from a TV station, the first transport stream carrying (i) standard media content indexed for processing by standard terrestrial-broadcast-TV receivers and (ii) supplemental media content not indexed for processing by standard terrestrial-broadcast-TV receivers. Further, the operations may include receiving via the at least one communication interface a second transport stream that is broadcast by satellite from a video-program source, the second transport stream carrying one or more TV shows and one or more commercials. In addition, the operations may include extracting from the received first transport stream at least a portion of the supplemental media content, inserting the extracted portion of the supplemental media content into the received second transport stream in place of at least one of the one or more commercials, thereby establishing a modified transport stream that carries at least a portion of the TV shows and that carries the extracted portion of supplemental media content in place of the at least one commercial, and outputting via the at least one communication interface the modified transport stream for delivery to CPE receivers.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
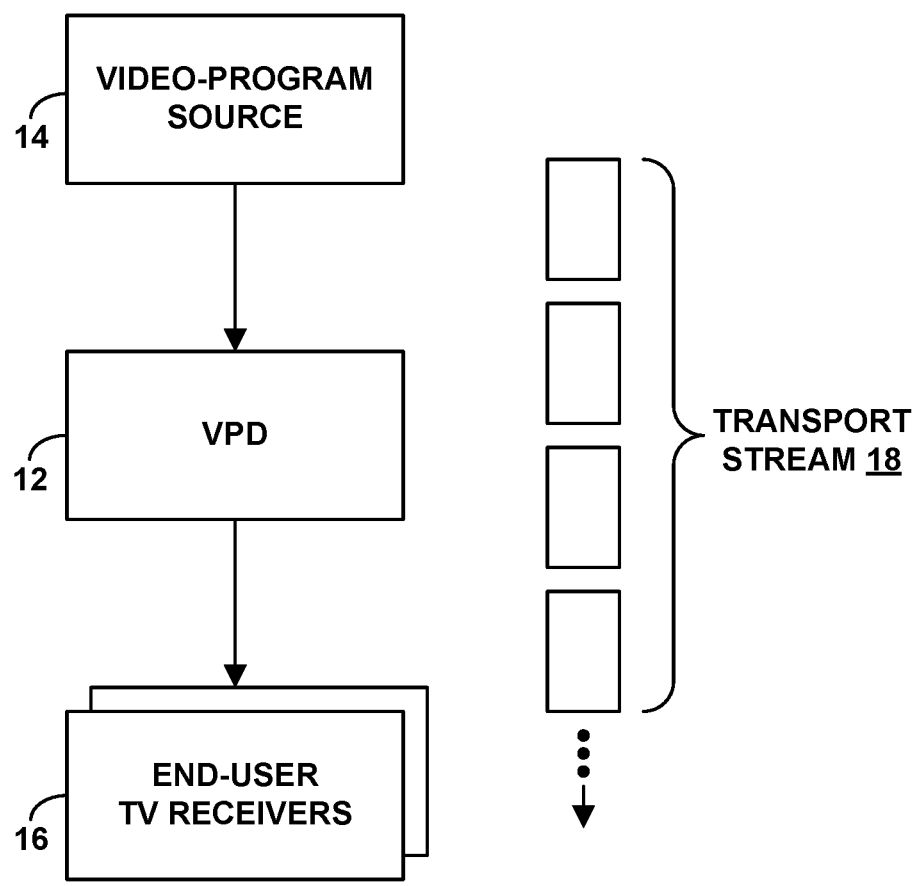
FIG. 1 is a simplified block diagram of a basic arrangement in which a VPD receives a transport stream and delivers content of the transport stream to end-user TV receivers in the VPD's market area.

Referring to the drawings, as noted above, FIG. 1 is a simplified block diagram depicting a basic arrangement in which a VPD 12 receives a transport stream from a video-program source 14 and delivers the received transport stream to end-user TV receivers 16 in the VPD's market area.

In practice, as discussed above, the VPD 12 may take various forms and may be configured to deliver transport streams to end-user TV receivers in various ways. By way of example, the VPD may be a cable-TV provider (e.g., a cable-TV head-end) that transmits content to end-user TV receivers through hybrid fiber/coaxial cable connections, a terrestrial over-the-air broadcast TV provider (e.g., a broadcast TV station) that transmits content through a terrestrial over-the-air interface to end-user TV receivers, or perhaps even a satellite-TV provider that transmits content through satellite transmission to end-user TV receivers, among other possibilities.

Accordingly, the end-user TV 16 receivers may also take various forms, configured to be able to receive transport streams from the VPD and to provide content of those streams for playout on TVs or other such devices. For instance, if the VPD is a cable-TV provider, then the end-user TV receivers may be cable-TV receivers such as set-top boxes or similar receivers integrated into TVs or other equipment. Whereas, if the VPD is a terrestrial over-the-air broadcast TV provider, then the end-user TV receivers may be standard broadcast TV receivers with associated antenna structures for receiving the over-the-air broadcast and with associated control logic for processing the received broadcast for playout.

Further, the video-program source 14 may take various forms as well and may transmit a transport stream to the VPD in various ways. For example, the video-program source may be a media provider that provides a national video feed by satellite transmission, in which case the VPD would make use of a satellite receiver for receiving the transport stream from the video-program source. And as another example, the video-program source may be a media provider that provides a transport stream to the VPD in some other manner, and the VPD would be correspondingly equipped to receive the transport stream in that manner from the video-program source for processing.

The transport stream that the VPD receives from the video-program source in this arrangement may carry one or more TV shows and one or more commercials (including for instance, commercial advertisements and/or promotions). Further, the transport stream may be a digital transport stream compliant with an industry standard, such as ATSC A/53, and may thus define a sequence of packets 18, which may have PIDs characterizing their payload. In practice, the VPD may thus receive such a transport stream and transmit the stream along to end-user TV receivers served by the VPD. As an end-user TV receiver receives the transport stream, the receiver may then read the PIDs of the packets to determine the provided payload type and may process the payload accordingly, so as to output audio, video, and/or closed-captioning content for playout for instance.

Figure 2:
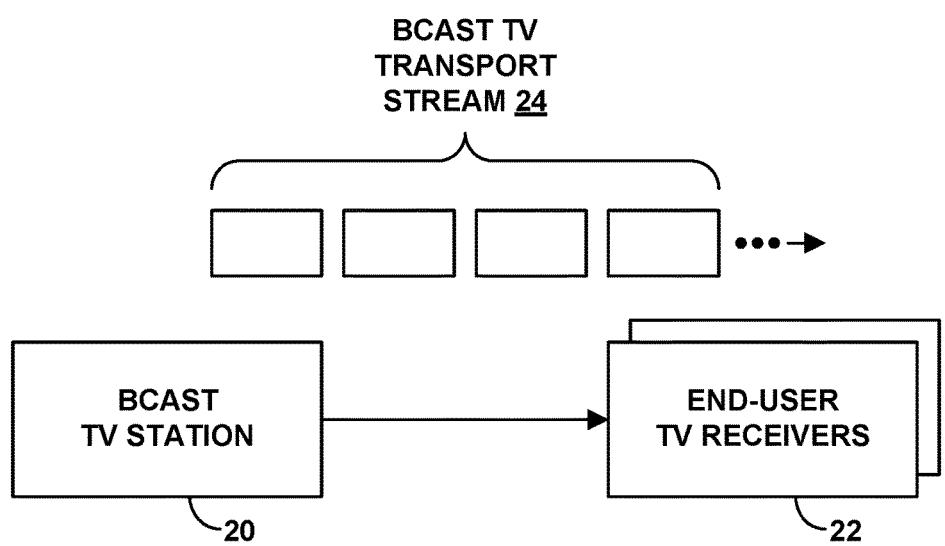
FIG. 2 is a simplified block diagram of a basis arrangement in which a broadcast TV station broadcasts a transport stream over the air for receipt by end-user TV receivers.

FIG. 2 is next an illustration of a basic arrangement in which a broadcast TV station 20 broadcasts a transport stream over the air for receipt by end-user TV receivers 22.

In this arrangement, the broadcast TV station may be a terrestrial over-the-air broadcast TV station of the type that delivers video program through terrestrial over-the-air transmission to appropriately configured end-user broadcast TV receivers. Thus, the broadcast TV station may operate a powerful transmitter and antenna structure (such as a tower top, or building top antenna) to provide such a broadcast in a local market area. As discussed above, the transport stream provided by the broadcast TV station may be a digital transport stream compliant with an industry standard such as ATSC A/53, and may thus define a sequence of packets 24, which may have PIDs characterizing their payload. And the end-user TV receivers 22 may be terrestrial broadcast-TV receivers with antenna structures and DTAs configured to receive and process the digital transport stream for playout. In some cases, these end-user TV receivers 22 may be the same end-user TV receivers 16 that are configured to receive and process transport streams from the VPD 12.

Figure 3:
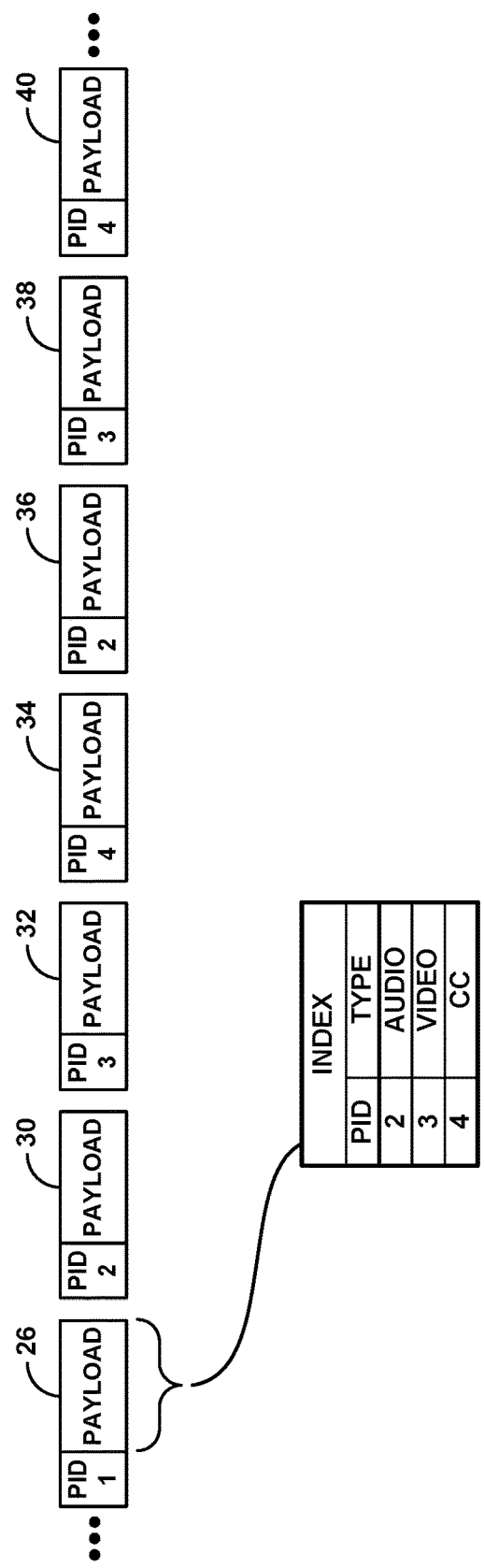
FIG. 3 is an illustration of a representative broadcast-TV transport stream.

FIG. 3 is next a more specific example illustration of a representative broadcast-TV transport stream 24 of the type that broadcast TV station 20 may transmit for receipt by end-user TV receivers 22. As shown in this example, the transport stream includes a sequence of packets (seven of which, 26-40, are shown for simplicity) that each have a header portion and a payload portion. The header of each packet in this sequence is shown including a respective PID that characterizes a type of the payload in the packet, such as whether the payload is audio content, video content, closed-captioning content, or other (e.g., ancillary) content, and/or indicating an underlying media stream to which the payload belongs. Further, from time to time, the example transport stream includes an index-packet that has a pre-defined index-packet PID and that carries as payload a set of mapping data that correlates various PIDs with various payload types.

In this example, for instance, packet 26 is shown as an index-packet having PID "1" (which, in practice, may be a more specific hex value) that end-user TV receivers 22 are programmed to treat as indicating that the packet is an index-packet. As shown in the exploded view in the figure, the payload of the index-packet then includes mapping data that correlates PIDs "2", "3", and "4" with particular payload types and/or underlying media streams. In particular, the mapping data specifies that PID "2" corresponds with audio data, PID "3" corresponds with video data, and PID "4" corresponds with closed-captioning data.

With this arrangement, a TV receiver would thus receive this index-packet 26 and make note of the correlations, and as the TV receiver then receives the subsequent packets of the transport stream, the TV receiver would process each packet accordingly based on its payload type. For instance, as the TV receiver receives packets 30 and 36, the receiver may process the payload of those packets as audio for playout based on their being tagged with PID "2"; as the TV receiver receives packets 32 and 38, the receiver may process the payload of those packets as video for playout based on their being tagged with PID "3"; and as the TV receiver receives packets 34 and 40, the receiver may process the payload of those packets as closed-captioning for playout based on their being tagged with PID "4". This processing of each type of payload may involve extracting the underlying payload of various packets, recombining the payload together into an underlying media stream, and playing out the underlying media stream, perhaps in conjunction with one or more other underlying media streams (such as playing out a video program by presenting its video content, audio content, and closed-captioning content concurrently).

Figure 4:
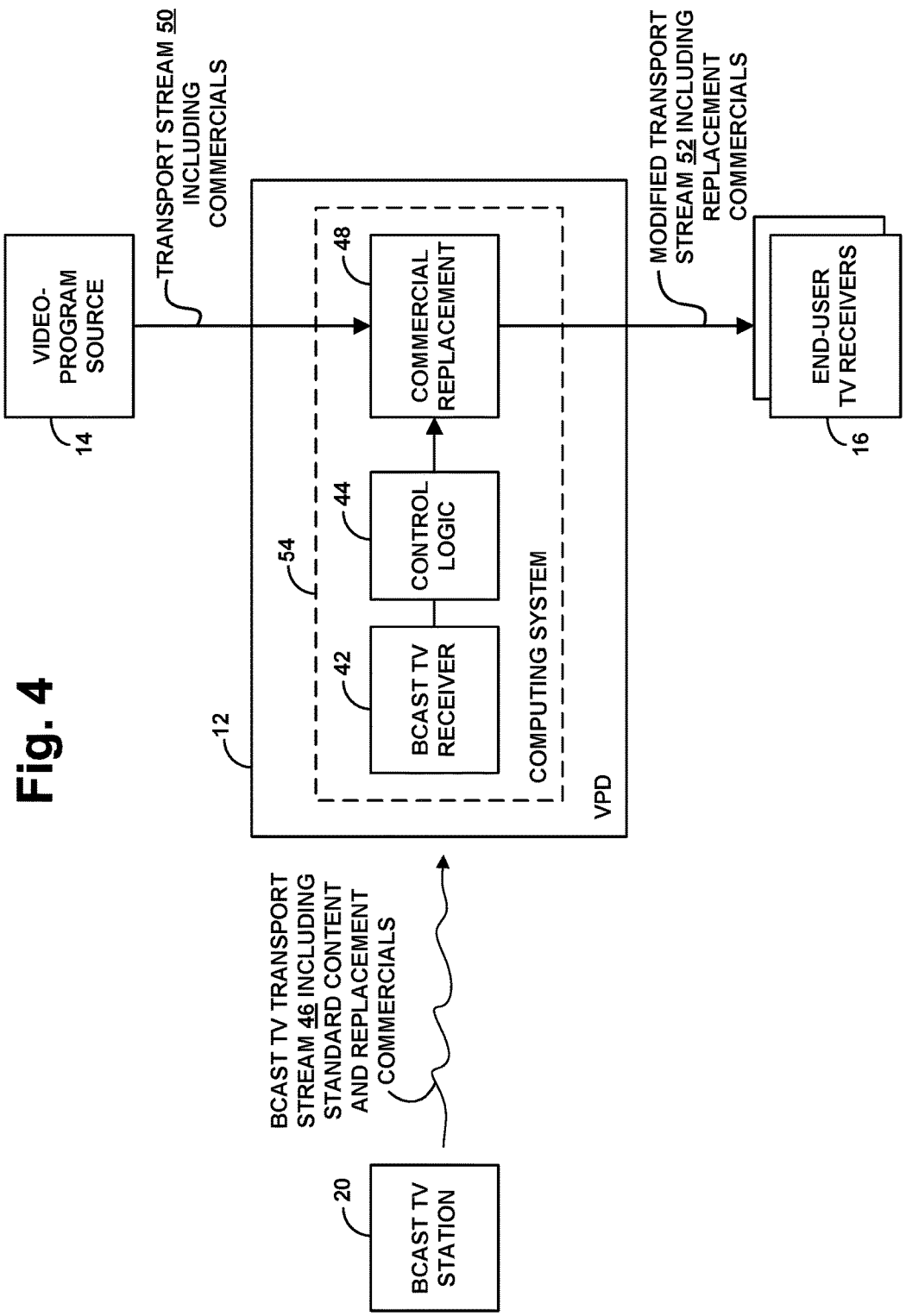
FIG. 4 is a simplified block diagram of an arrangement in which supplemental media content, such as replacement commercials, is provided by a local over-the-air TV broadcast to a VPD, to facilitate insertion of the supplemental media content into a separately received transport stream for delivery to end-user TV receivers.

As noted above, the present method and system advances at least in part by making use of a local TV broadcast to deliver supplemental content, such as replacement commercials, to a VPD for the VPD to insert into a separately received transport stream for delivery to end-user TV receivers. FIG. 4 illustrates an example arrangement for implementing this advance.

As shown in FIG. 4, the VPD 12 in this arrangement is itself equipped with broadcast-TV receiver 42 and associated control logic 44 for receiving a transport stream 46 via over-the-air broadcast from the local broadcast TV station 20 and for extracting supplemental content such as replacement commercials from that transport stream 46. VPD 12 then includes a module 48 for inserting the extracted supplemental content into a transport stream 50 that VPD 12 separately receives from video program source 14, such as in place of one or more commercials or other base content in the transport stream 50, to thereby produce a modified transport stream 52 that includes the supplemental content in place of the base content. The VPD may then deliver that modified transport stream to the end-user TV receivers 16 for play out.

As illustrated, the broadcast TV receiver 42, associated control logic 44, and content replacement module 48 may be considered to define components of a computing system 54 at the VPD. In practice, the broadcast TV receiver 42 may comprise a DTA much like what a standard end-user broadcast TV receiver 22 would include, and the associated control logic and content replacement module 48 may be separate or integrated with the broadcast TV receiver 42 and may comprise one or more computer processors programmed with instructions to carry out various logical operations described herein.

In practice, the transport stream 46 broadcast by broadcast TV station 20 in this arrangement will be a special version of the broadcast transport stream 24 discussed above, in that transport stream 46 will not only carry standard media content that is indexed for processing by standard broadcast TV receivers such as end-user TV receivers 22 as discussed above, but will also carry supplemental media content (such as replacement commercials) that is not indexed for processing by standard broadcast-TV receivers but that computing system 54 is specially configured to recognize and process.

To achieve this in an example implementation, a computing system (not shown) at the broadcast TV station may receive standard media content (e.g., audio, video, closed-captioning, etc.) and packetize that content into one sequence of packets having associated indexed PIDs, and may receive supplemental media content (e.g., one or more replacement commercials) and packetize that content into another sequence of packets having non-indexed PIDs, and the computing system may multiplex the sequences of packets together to generate a combined transport stream 46, which the broadcast TV station may then modulate for radio frequency transmission to broadcast TV receivers. In this process, the PIDs of the standard media content packets would be indexed by one or more index-packets as discussed above. But the PIDs of the supplemental media content packets would not be so indexed. Consequently, or through other means, standard broadcast TV receivers would have no basis to process the supplemental media content packets (and would thus disregard them). However, the computing system 54 at the VPD would be specially programmed to recognize the non-indexed PIDs of the supplemental media content packets, so that the computing system 54 can process those supplemental media content packets.

Figure 5:
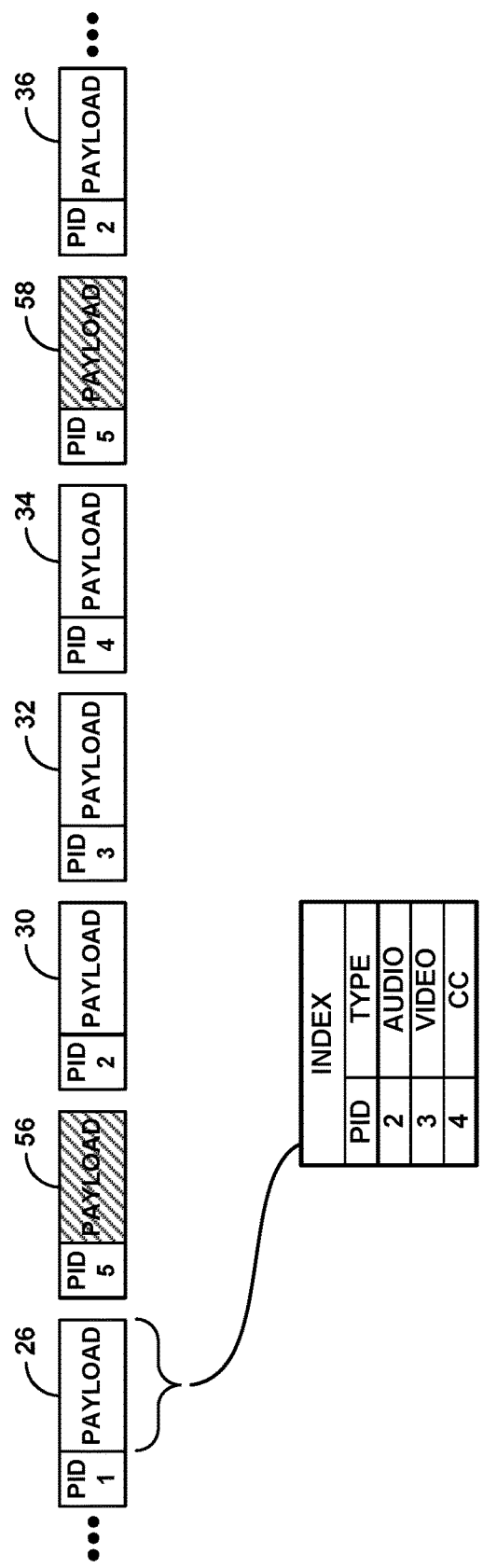
FIG. 5 is an illustration of a representative broadcast-TV transport stream including standard media content and supplemental media content.

FIG. 5 depicts an example of this transport stream arrangement, as a variation of the broadcast TV transport stream 24 shown in FIG. 3. In particular, FIG. 5 shows two of example supplemental media content packets 56 and 58 added into the transport stream, with their supplemental media content payload sections shown with shading in the figure. These two example added packets are shown being tagged with PID "5". But the index-packet 26 does not list PID "5". Consequently, standard broadcast TV receivers that receive this transport stream would disregard those packets. On the other hand, computing system 54 at VPD 12 may be programmed to recognize PID "5" as corresponding with supplemental media content for processing as described herein, without a need for PID "5" to be indexed.

The supplemental media content provided in the broadcast TV transport stream in this process may include various discrete pieces of content, such as various commercials (along with information identifying the commercials and providers), perhaps with each piece of content being carried by packets tagged with a respective corresponding non-indexed PID. Further, the broadcast TV station could provide the supplemental media content slowly over time (as a trickle transmission) within the broadcast TV transport stream, in an effort to not disrupt the real-time nature of the broadcast TV transmission in a user-perceivable manner. Still further, to facilitate this, the broadcast TV station could reduce the coding rate of the standard media content included in the broadcast TV transport stream slightly from a normal level, in an effort to make room in the transport stream for inclusion of the supplemental media content packets.

In example practice with this arrangement, the computing system 54 at VPD 12 may thus receive the transport stream 46 and extract from the stream at least a portion of the included supplemental media content, and the computing system 54 or other equipment at VPD 12 may then insert that extracted supplemental media content in place of one or more commercials and/or other instances of base content in the transport stream 50 that VPD 12 receives from video-program source 14. For example, if the supplemental media content comprises one or more replacement commercials, the computing system 54 could extract at least one such commercial (e.g., with associated audio, video and/or other content) and insert the extracted commercial(s) in place of one or more commercials in transport stream 50. This insertion process may involve inserting into the transport stream new packets that carry the replacement commercial content, perhaps in place of packets that carried the commercials being replaced.

As the supplemental media content may arrive slowly over time within the broadcast TV transport stream 46, the computing system 54 may be configured to store the extracted supplemental media content and to then later inject some or all of that extracted supplemental media content into the transport stream 50 as and when appropriate. As discussed above, for instance, the transport stream 50 that the VPD 12 receives from video-program provider 14 may include in-band or out-of-band control signals indicating insertion points (e.g., time points in the stream where supplemental content can or should be inserted). The computing system 54 may thus be configured to monitor the received transport stream 50 to detect such trigger points and to insert portions of the extracted supplemental media content at the detected points, so as to generate the modified transport stream 52 for delivery to end-user TV receives.

In an example implementation of this process, the supplemental media content included in the broadcast TV transport stream may include commercials provided by various commercial-providers, and the computing system 54 or an associated entity may be configured to select from those provided a commercial to insert into the transport stream 50. In practice, this selection process could be based on bidding by the commercial-providers. For instance, the commercial-providers may engage in a bidding process to compete for placement of their commercials within or between particular TV shows in transport stream 50, and computing system 54 may select the commercial having the highest bid. Other examples are possible as well.

Figure 6:
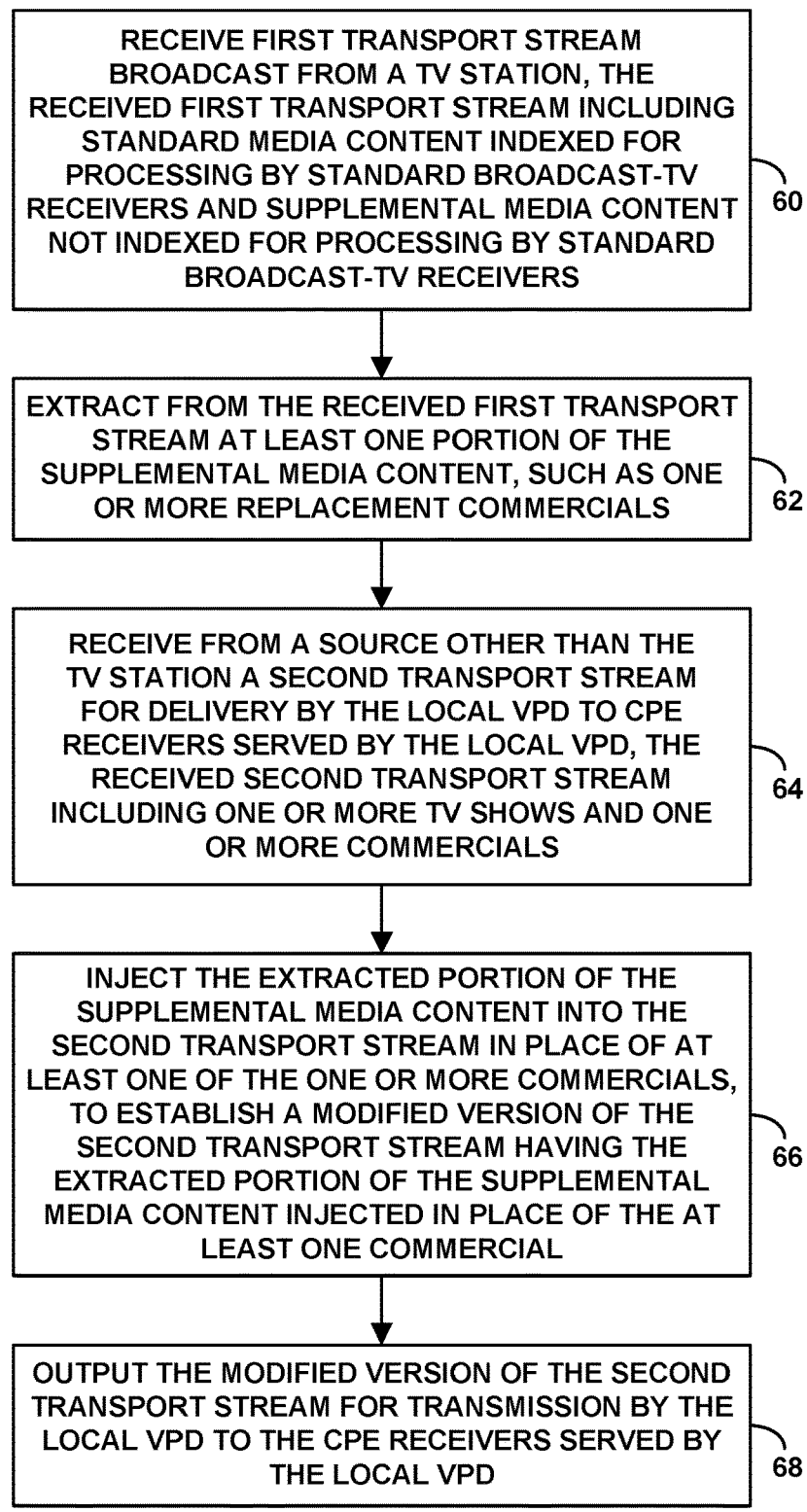
FIG. 6 is a flow chart depicting operations that can be carried out in accordance with the present disclosure.

FIG. 6 is next a flow chart depicting example operations that can be carried out by a computing system such as computing system 54 for instance at a local VPD (i.e., at a VPD that serves a particular market area). Although the blocks of this figure are shown in series, it is possible that various illustrated operations could be carried out concurrently or in a different order. Further, other variations may be possible as well.

As shown in FIG. 6, at block 60, the computing system receives a first transport stream (e.g., transport stream 46) broadcast from a TV station (e.g., TV station 20), the received first transport stream including standard media content indexed for processing by standard broadcast-TV receivers and supplemental media content not indexed for processing by standard broadcast-TV receivers. And at block 62, the computing system extracts from the received first transport stream at least one portion of the supplemental media content, such as one or more replacement commercials.

Further, at block 64, the computing system receives from a source other than the TV station (e.g., from video-program source 14), a second transport stream for delivery by the local VPD to CPE receivers (e.g., end-user TV receivers 16) served by the local VPD, the received second transport stream including one or more TV shows and one or more commercials. And at block 66, the computing system then injects the extracted portion of the supplemental media content into the second transport stream in place of at least one of the one or more commercials, to establish a modified version of the second transport stream having the extracted portion of the supplemental media content injected in place of the at least one commercial. At block 68, the computing system then outputs the modified version of the second transport stream for transmission by the local VPD to the CPE receivers served by the local VPD.

In this process, as discussed above, the TV station can be a terrestrial over-the-air broadcast TV station configured to terrestrially broadcast the first transport stream over the air for receipt by broadcast-TV receivers that are configured to receive terrestrial over-the-air TV broadcasts. In that case, the local VPD may be equipped with a given such broadcast-TV receiver configured to receive terrestrial over-the-air TV broadcasts, and it would be that broadcast-TV receiver that would receive the first transport stream terrestrially broadcast over the air from the TV station. Further, the local VPD may be equipped with a controller, such as a programmed computer, separate from or integrated with the broadcast-TV receiver, which may carry out the extracting and injecting operations.

Additionally in line with the discussion above, the second transport stream may be broadcast substantially simultaneously (e.g., by satellite transmission from a video-program source) to multiple VPDs, each of which serves CPE receivers in a different respective geographic market, and the local VPD may be one such VPD and may serve CPE receivers in a particular geographic market. In that case, the at least one commercial could be a commercial that is generally for multiple geographic markets (such as a nationally-relevant commercial), and the extracted portion of the supplemental media content injected in place of the at least one commercial could be local content that is specific to the particular geographic market. For instance, the local content specific to the particular geographic market could comprise a commercial that advertises a product or service and/or a commercial that promotes video program content.

Further in line with the discussion above, the act of extracting from the first transport stream the at least one portion of the supplemental media content may involve extracting from the first transport stream multiple portions of the supplemental media content, such as multiple commercials. And the method may further involve the computing system storing the extracted multiple portions of the supplemental media content and selecting from the stored multiple portions of the supplemental media content a particular one of the portions of the supplemental media content to be injected into the second transport stream in place of the at least one commercial, so that the injected portion of the supplemental media content is the selected portion. As noted above, for instance, the multiple portions could be associated with multiple respective content providers, in which case selecting the portion to be injected could be based on bidding among the multiple content providers to determine which content provider's portion of the supplemental media content will be injected.

Figure 7:
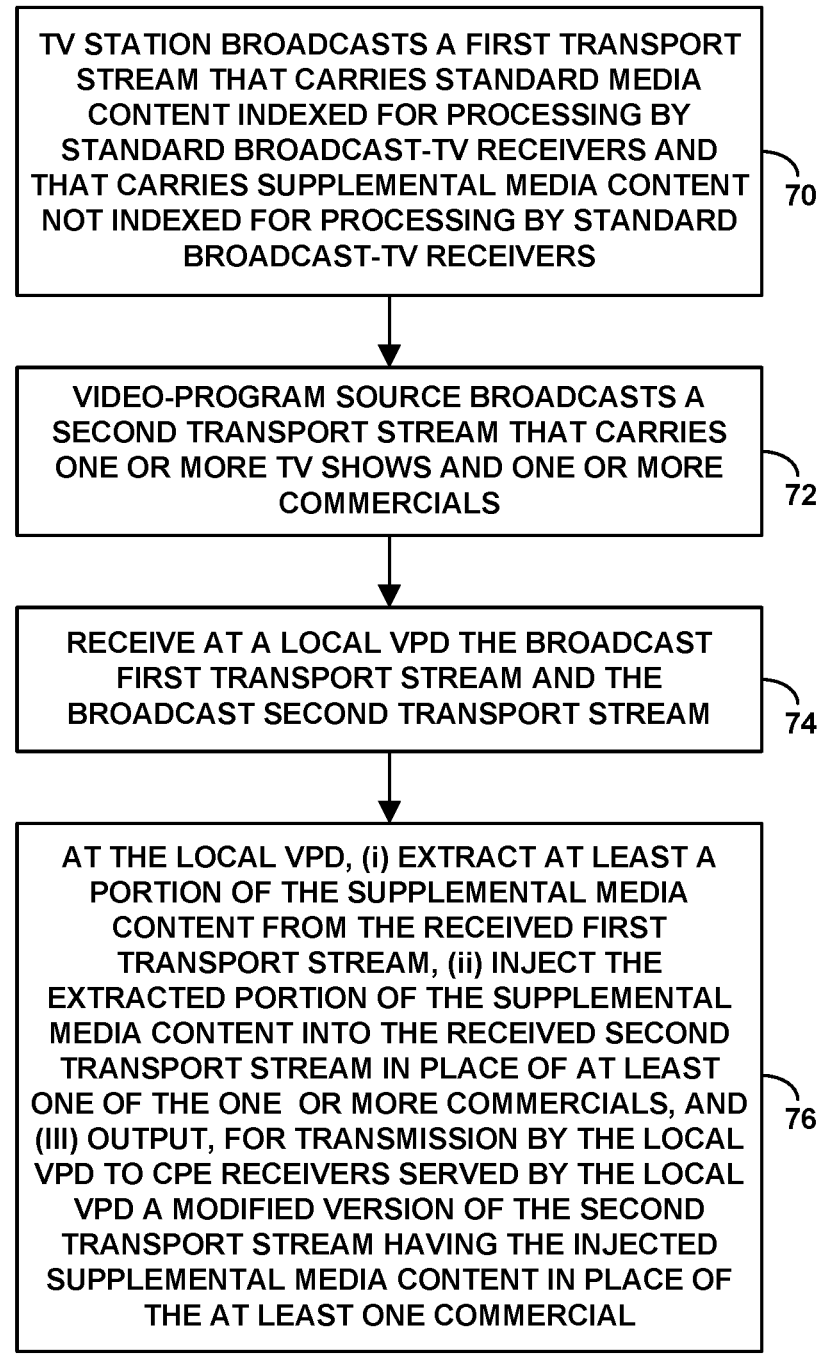
FIG. 7 is another flow chart depicting operations that can be carried out in accordance with the present disclosure.

FIG. 7 is next a flow chart depicting operations that can be carried out by one or more entities, such as by an operator of the broadcast TV station 20 and/or an operator of the video-program source 14 (perhaps by a company that owns and/or operates both the broadcast TV station and the video-program source). In practice, the one or more entities may also operate the VPD or may work with the VPD to implement a computing system such as that described above. Here again, the illustrated order or timing of steps could be varied. Further, details provided above could be applied within this method as well.

As shown in FIG. 7, at block 70, the method includes a TV station broadcasting a first transport stream that carries standard media content indexed for processing by standard broadcast-TV receivers and that carries supplemental media content not indexed for processing by standard broadcast-TV receivers. And at block 72, the method includes a video-program source broadcasting a second transport stream that carries one or more TV shows and one or more commercials. At block 74, the method then includes, at a local VPD, receiving the broadcast first transport stream and the broadcast second transport stream. And at block 76, the method includes, at the local VPD, (i) extracting at least a portion of the supplemental media content from the received first transport stream, (ii) injecting the extracted portion of the supplemental media content into the received second transport stream in place of at least one of the one or more commercials, and (iii) outputting, for transmission by the local VPD to CPE receivers served by the local VPD a modified version of the second transport stream having the injected supplemental media content in place of the at least one commercial.

Figure 8:
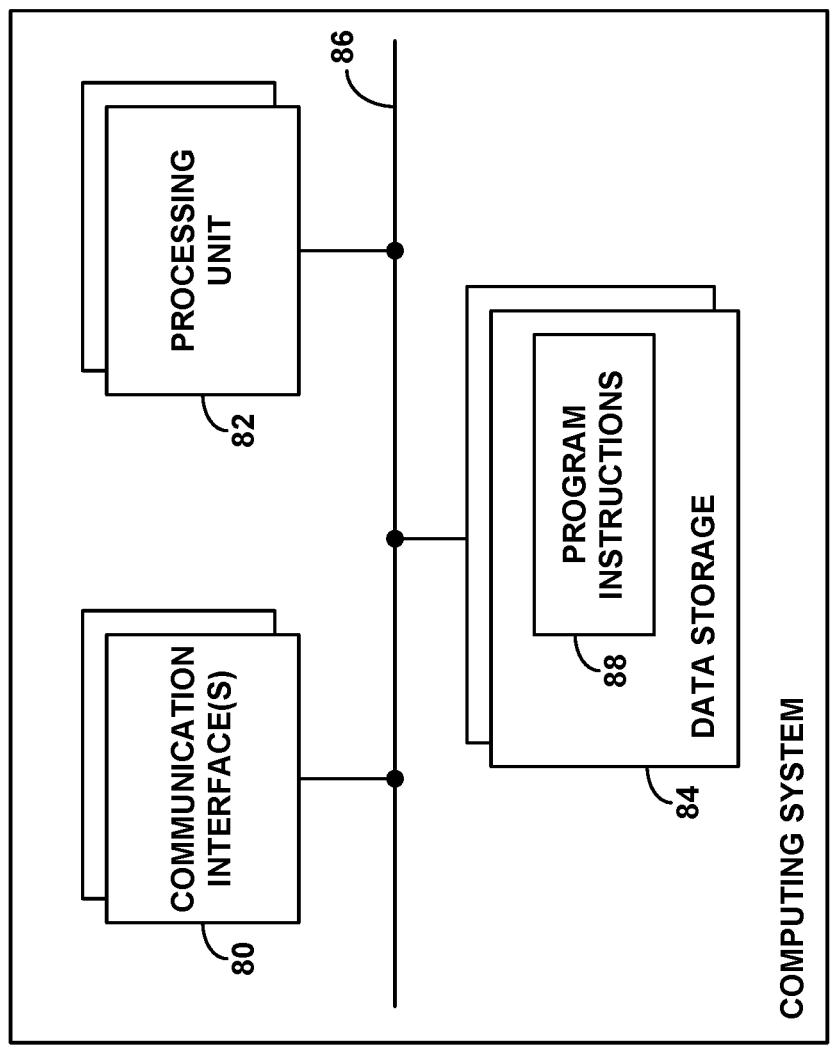
FIG. 8 is a simplified block diagram of a computing system, showing some of the components that such a system could include to facilitate carrying out features of the present disclosure.

Finally, FIG. 8 is a simplified block diagram showing some of the components that can be included in a computing system such as computing system 54 described above. As shown, the example computing system may include at least one communication interface 80, at least one processing unit 82, at least one non-transitory data storage 84, all of which may be communicatively linked together by a system bus, network, or other connection mechanism 86.

In practice, the at least one communication interface 80 could include a broadcast TV receiver (not shown) configured to receive a transport stream broadcast from broadcast TV station 20, and could also include a satellite receiver (not shown) configured to receive a transport stream broadcast from video-program source 14. Alternatively, these receivers could be external to the computing system, and the at least one communication interface could be an Ethernet or other such network communication interface arranged to receive outputs (e.g., packet data) from the receivers for processing as described herein.

The at least one processing unit 82 may then comprise one or more general purposes processors (e.g., microprocessors) and/or one or more special purpose processors (e.g., application specific integrated circuits, etc.) and could be integrated in whole or in part with the at least one communication interface 80. Further, the at least one data storage 84 could comprise one or more volatile and/or non-volatile storage components, such as magnetic, optical, or flash storage, and could be integrated in whole or in part with the at least one processing unit 82.

As shown, the data storage may then store program instructions 88 that are executable by the at least one processing unit 82 to carry out various operations as described herein. For instance, the program instructions may be executable to receive via the at least one communication interface 80 a first transport stream that is broadcast terrestrially over the air from a TV station, the first transport stream carrying (i) standard media content indexed for processing by standard terrestrial-broadcast-TV receivers and (ii) supplemental media content not indexed for processing by standard terrestrial-broadcast-TV receivers. Further, the program instructions may be executable to receive via the at least one communication interface 80 a second transport stream that is broadcast by satellite from a video-program source, the second transport stream carrying one or more TV shows and one or more commercials.

In addition, the program instructions may be executable to extract from the received first transport stream at least a portion of the supplemental media content, to insert the extracted portion of the supplemental media content into the received second transport stream in place of at least one of the one or more commercials, thereby establishing a modified transport stream carrying at least a portion of the TV shows and carrying the extracted portion of supplemental media content in place of the at least one commercial, and to output via the at least one communication interface the modified transport stream for delivery to CPE receivers.

Exemplary embodiments have been described above. Those skilled in the art will understand, however, that changes and modifications may be made to these embodiments without departing from the true scope and spirit of the invention.

We claim:

1. A broadcast-TV station configured to provide supplemental media content to a video program distributor (VPD) to enable the VPD to insert the supplemental media content into a transport stream that the VPD outputs for transmission to customer premises equipment (CPE) receivers served by the VPD, the broadcast-TV station comprising:
   a transmitter and antenna structure through which the broadcast-TV station is configured to broadcast, through terrestrial over-the-air transmission in a local market area, a broadcast-TV transport stream comprising a sequence of packets; and
   a first computing system configured to generate a combined transport stream that multiplexes together (i) a sequence of standard-media-content packets that carry standard media content and that are indexed for processing by standard broadcast-TV receivers and (ii) a sequence of supplemental-media-content packets that carry the supplemental media content and that are not indexed for processing by standard broadcast-TV receivers but that are recognizable by a second computing system at the VPD as being packets that carry the supplemental media content,
   wherein the broadcast-TV station is configured to modulate the combined transport stream and to broadcast the modulated combined transport stream for receipt by broadcast-TV receivers that are configured to receive terrestrial over-the-air TV broadcasts,
   whereby upon receipt of the broadcast combined transport stream by the second computing system at the VPD, the supplemental-media-content packets can be recognized and processed by the second computing system to enable the second computing system to extract the supplemental media content from the supplemental-media-content packets and to insert the extracted supplemental media content into the transport stream that the VPD outputs for transmission to the CPE receivers served by the VPD.

2. The broadcast-TV station of claim 1, wherein the antenna structure comprises a tower top antenna.

3. The broadcast-TV station of claim 1, wherein the antenna structure comprises a building top antenna.

4. The broadcast-TV station of claim 1, wherein the supplemental media content comprises one or more commercial advertisements.

5. The broadcast-TV station of claim 4, wherein each of the one or more commercial advertisements is specific to the local market area.

6. The broadcast-TV station of claim 4, wherein each of the one or more commercial advertisements is at least one of (i) a commercial that advertises a product or service or (ii) a commercial that promotes video program content.

7. The broadcast-TV station of claim 1, wherein the standard media content comprises content selected from the group consisting of audio content, video content, and closed-captioning content.

8. The broadcast-TV station of claim 1, wherein the first computing system is configured to include, in the combined transport stream, index packets that index packet identifiers included in the headers of the standard-media-content packets but that do not index packet identifiers included in the headers of the supplemental-media-content packets.

9. A broadcast-TV station configured to provide supplemental media content to a video program distributor (VPD) to enable the VPD to insert the supplemental media content into a transport stream that the VPD outputs for transmission to customer premises equipment (CPE) receivers served by the VPD, the broadcast-TV station comprising:
   a transmitter and antenna structure through which the broadcast-TV station is configured to broadcast, through terrestrial over-the-air transmission in a local market area, a broadcast-TV transport stream comprising a sequence of packets; and
   a first computing system configured to carry out operations including (i) receiving standard media content and packetizing the received standard media content into a first sequence of packets that are indexed for processing by standard broadcast-TV receivers, (ii) receiving supplemental media content and packetizing the received supplemental media content into a second sequence of packets that are not indexed for processing by standard broadcast-TV receivers but that are recognizable by a second computing system at the VPD as being packets that carry the supplemental media content, and (iii) multiplexing the first and second sequences of packets together to generate a combined transport stream,
   wherein the broadcast-TV station is configured to modulate the combined transport stream for radio-frequency transmission to broadcast-TV receivers,
   whereby, upon receipt of the broadcast combined transport stream by the second computing system at the VPD, the packets of the second sequence can be recognized and processed to enable extracting of the supplemental media content and insertion of the extracted supplemental media content into the transport stream that the VPD outputs for transmission to the CPE receivers.

10. The broadcast-TV station of claim 9, wherein the supplemental media content comprises one or more commercial advertisements.

11. The broadcast-TV station of claim 10, wherein each of the one or more commercial advertisements is specific to the local market area.

12. The broadcast-TV station of claim 10, wherein each of the one or more commercial advertisements is at least one of (i) a commercial that advertises a product or service or (ii) a commercial that promotes video program content.

13. The broadcast-TV station of claim 9, wherein the standard media content comprises content selected from the group consisting of audio content, video content, and closed-captioning content.

14. The broadcast-TV station of claim 9, wherein the first computing system is configured to include, in the combined transport stream, index packets that index packet identifiers included in the headers of the standard-media-content packets but that do not index packet identifiers included in the headers of the supplemental-media-content packets.

15. A broadcast-TV station configured to provide supplemental media content to a video program distributor (VPD) to enable the VPD to insert the supplemental media content into a transport stream that the VPD outputs for transmission to customer premises equipment (CPE) receivers served by the VPD, the broadcast-TV station comprising:
   a transmitter and antenna structure through which the broadcast-TV station is configured to broadcast, through terrestrial over-the-air transmission in a local market area, a broadcast-TV transport stream comprising a sequence of packets,
   wherein the broadcast-TV station is configured to include, in the broadcast-TV transport stream, standard-media-content packets that carry standard media content and that are indexed for processing by standard broadcast-TV receivers to enable standard broadcast-TV receivers to process the carried standard media content, and
   wherein the broadcast-TV station is configured to include, in the broadcast-TV transport stream, supplemental-media-content packets that carry the supplemental media content and that are not indexed for processing by standard broadcast-TV receivers but are recognizable by a computing system at the VPD as being supplemental-media-content packets, to enable the computing system at the VPD to extract the supplemental media content from the supplemental-media-content packets and to insert the extracted supplemental media content into the transport stream that the VPD outputs for transmission to the CPE receivers served by the VPD.

16. The broadcast-TV station of claim 15, wherein the broadcast-TV station is further configured to (i) receive the standard media content, (ii) packetize the received standard media content into the standard-media-content packets, (iii) receive the supplemental media content, and (iv) packetize the received supplemental media content into the supplemental-media-content packets.

17. The broadcast-TV station of claim 15, wherein including in the broadcast-TV transport stream the standard-media-content packets and the supplemental-media-content packets comprises multiplexing the standard-media-content packets with the supplemental-media-content packets to produce a multiplexed packet sequence, and including the multiplexed packet sequence in the broadcast-TV transport stream.

18. The broadcast-TV station of claim 15, wherein the supplemental media content comprises one or more commercial advertisements.

19. The broadcast-TV station of claim 15, wherein each of the one or more commercial advertisements is specific to the local market area.

20. The broadcast-TV station of claim 15, wherein the broadcast-TV station is further to include, in the broadcast-TV transport stream, index packets that index the packet identifiers included in the headers of the standard-media-content packets but that do not index packet identifiers included in the headers of the supplemental-media-content packets.

* * * * *